United States Patent Office 3,147,258
Patented Sept. 1, 1964

3,147,258
AMINO CHROMONES WITH CENTRAL NERVOUS SYSTEM STIMULATING ACTIVITY
Paolo Da Re, Milan, Italy, assignor to Recordati Laboratorio Farmacologico S.p.A., Milan, Italy
No Drawing. Filed Nov. 28, 1961, Ser. No. 155,468
Claims priority, application, Switzerland, Oct. 16, 1959, 79,522
4 Claims. (Cl. 260—247.7)

This invention relates to novel organic compounds possessing central nervous system stimulating activity, and particularly brain stem stimulants. This application is a continuation-in-part of Application Nos. 840,536 and 58,899, filed September 17, 1959, and September 28, 1960, respectively, both now abandoned.

It is an object of the invention to provide improved compounds of the above-noted type.

Compounds according to the invention are represented by the general formula:

Formula 1

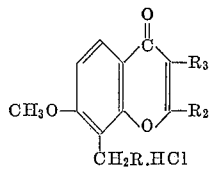

wherein R is a member selected from the group consisting of

in which $R_4$ and $R_5$ are alkyl radicals having less than 3 carbon atoms,

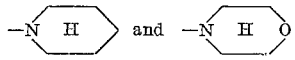

$R_2$ is a member selected from the group consisting of alkyl radicals having less than 3 carbon atoms or phenyl and $R_3$ is an alkyl radical having less than 3 carbon atoms.

The compounds covered by Formula 1 may be prepared by condensing a substituted 8-chloromethyl-7-methoxy chromone in a solvent with a secondary amine in molar ratio 1:2 under reflux boiling or in an autoclave; cooling and filtering the reaction mixture and concentrating it until dry under vacuum; taking up the residue in water and extracting the undissolved portion by means of a solvent; working the extract with a saturated solution of sodium chloride, drying it on anhydrous sodium sulphate and admixing it with alcoholic hydrochloric acid in excess; concentrating the extract until dry under vacuum and recrystallizing the residue from a solvent.

The substituted 8-chloromethyl-7-methoxy chromone may be either 8-chloromethyl-2,3-dialkyl-7-methoxy chromone or 8-chloromethyl-2-aryl-3-alkyl-7-methoxy chromone.

Examples of secondary amines which may be employed include dimethylamine, diethylamine, piperidine and morpholine.

Compounds coming within the scope of the present invention include:

8-dimethylaminomethyl-7-methoxy-3-methyl-2-phenylchromone-HCl;
8-diethylaminomethyl-7-methoxy-3-methyl-2-phenylchromone-HCl;
7-methoxy-3-methyl-2-phenyl-8-piperidinomethyl chromone-HCl;
7-methoxy-3-methyl-8-morpholinomethyl-2-phenylchromone-HCl;
8-dimethylaminomethyl-3-ethyl-7-methoxy-2-phenylchromone-HCl;
8-diethylaminomethyl-3-ethyl-7-methoxy-2-phenylchromone-HCl;
3-ethyl-7-methoxy-2-phenyl-8-piperidinomethyl-chromone-HCl;
3-ethyl-7-methoxy-8-morpholinomethyl-2-phenyl-chromone-HCl;
2,3-dimethyl-8-dimethyl-aminomethyl-7-methoxy-chromone-HCl;
8-diethylaminomethyl-2,3-dimethyl-7-methoxy-chromone-HCl;
2,3-dimethyl-7-methoxy-8-piperidinomethyl chromone-HCl;
2,3-dimethyl-7-methoxy-8-morpholinomethyl chromone-HCl;
3-ethyl-2-methyl-7-methtoxy-8-piperidinomethyl chromone-HCl;
3-ethyl-2-methyl-7-methoxy-8-morpholinomethyl chromone-HCl;
8-diethylaminomethyl-2-ethyl-3-methyl-7-methoxy chromone-HCl;
2-ethyl-3-methyl-7-methoxy-8-morpholinomethyl-chromone-HCl;
2,3-diethyl-7-methoxy-8-piperidinomethyl chromone-HCl; and
2,3-diethyl-7-methoxy-8-morpholinomethyl-chromone-HCl.

In order that the invention may be more clearly understood and readily carried into effect with respect to Formula 1 the following non-limiting examples are given:

EXAMPLE I

8 - Dimethylaminomethyl - 7 - Methoxy - 3 - Methyl - 2- Phenyl Chromone-HCl

A mixture of 15.7 gr. of 8-chloromethyl-7-methoxy-3-methyl-2-phenylchromone, 400 ml. of absolute ethanol and 15 ml. of an alcoholic solution of dimethylamine 10% was heated in an autoclave for 5–8 hrs. at 90–100° C.

Removal of the solvent left a residue which was taken up in water and the separated base was taken up in chloroform. The chloroformic layer was washed 3 times with a saturated solution of NaCl, dried over anhydrous sodium sulphate, filtered and acidified with alcoholic hydrochloric acid in slight excess of the theoretical amount.

The removal of the solvent left a residue which on crystallizing from ethanol/ether gave gm. 9.87 of a white crystalline product having a melting point of 213–214° C. (dec.).

Analysis calculated for $C_{20}H_{22}O_3NCl$—Effective: Percent N, 3.90; percent Cl, 9.85. Calc.: Percent N, 3.90; percent Cl, 9.87.

EXAMPLE II

8 - Diethylaminamethyl - 7 - Methoxy - 3 - Methyl - 2- Phenylchromone-HCl

The same procedure was followed as in Example I, starting with 8-chloromethyl-7-methoxy-3-methyl-2-phenylchromone and diethylamine in a molar ratio of 1:2.

The yield was 51% and a product was obtained having a melting point of 187–188° C.

Analysis for $C_{22}H_{26}O_3$ NCl.—Effective: Percent N, 3.58; percent Cl, 9.10. Calc.: percent N, 3.61; percent Cl, 9.14.

EXAMPLE III

*7 - Methoxy - 3 - Methyl - 2 - Phenyl - 8 - Piperidinomethyl Chromone*-HCl

The same procedure was followed as in Example I, starting with 8-chloromethyl-7-methoxy-3-methyl-2-phenyl chromone and piperidine in a molar ratio of 1:2.

The yield was of 71% and a product was obtained having a melting point of 217–218° C.

Analysis for $C_{23}H_{26}O_3NCl$.—Effective: Percent N, 3.52; percent Cl, 8.87. Calc.: Percent N, 3.50; percent Cl, 8.87.

EXAMPLE IV

*7 - Methoxy - 3 - Methyl - 8 - Morpholinomethyl - 2 - phenyl Chromone*-HCl

The same procedure was followed as in Example I, starting with 8-chloromethyl-7-methoxy-3-methyl-2-phenyl chromone and morpholine in a molar ratio of 1:2.

The yield was 72% and a product was obtained having a melting point of 202–204° C.

Analysis for $C_{22}H_{24}O_4NCl$.—Effective: Percent N, 3.48; percent Cl, 8.81. Calc.: Percent N, 3.49; Percent Cl, 8.82.

EXAMPLE V

*8 - Dimethylaminamethyl - 3 - Ethyl - 7 - Methoxy - 2 - phenyl Chromone*-HCl

The same procedure was followed as in Example I, starting with 8-chloromethyl-3-ethyl-7-methoxy-2-phenyl chromone and dimethylamine in a molar ratio of 1:2.

The yield was of 31% and a product was obtained having a melting point of 208–209° C.

Analysis for $C_{21}H_{24}O_3NCl$.—Effective: Percent N, 3.75; percent Cl, 9.45. Calc.: Percent N, 3.74; percent Cl, 9.48.

EXAMPLE VI

*8-Diethylaminomethyl-3-Ethyl-7-Methoxy-2-Phenyl Chromone*-HCl

The same procedure was followed as in Example I, starting with 8-chloromethyl-3-ethyl-7-methoxy-2-phenyl chromone and diethylamine in a molar ratio of 1:2.

The yield was 36% and a product was obtained having a melting point of 205–206° C.

Analysis for $C_{23}H_{28}O_3NCl$.—Effective: Percent N, 3.50; percent Cl, 8.80. Calc.: Percent N, 3.49; percent Cl, 8.82.

EXAMPLE VII

*3-Ethyl-7-Methoxy-2-Phenyl-8-Piperidinomethyl Chromone*-HCl

The same procedure was followed as in Example I, starting with 8-chloromethyl-3-ethyl-7-methoxy-2-phenyl chromone and piperidine in a molar ratio of 1:2.

The yield was 43% and a product was obtained having a melting point of 226–227° C.

Analysis for $C_{24}H_{28}O_3NCl$.—Effective: Percent N, 3.36; percent Cl, 8.55. Calc.: Percent N, 3.38; percent Cl, 8.57.

EXAMPLE VIII

*3-Ethyl-7-Methoxy-8-Morpholinomethyl-2-Phenyl Chromone*-HCl

The same procedure was followed as in Example I, starting with 3-ethyl-8-chloromethyl-7-methoxy-2-phenyl chromone and from morpholine.

The yield was 41% and a product was obtained having a melting point of 188–191° C.

Analysis for $C_{23}H_{26}O_4NCl$.—Effective: Percent N, 3.37; percent Cl, 8.50. Calc.: Percent N, 3.37; percent Cl, 8.53.

EXAMPLE IX

*2,3-Dimethyl-8-Dimethyl-Aminomethyl-7-Methoxy Chromone*-HCl

The same procedure was followed as in Example I, starting with 8-chloromethyl-2,3-dimethyl-7-methoxy chromone and dimethylamine.

The yield was 21% and a product was obtained having a melting point of 190–192° C.

Analysis for $C_{15}H_{20}O_3NCl$.—Effective: Percent N, 4.68; percent Cl, 11.88. Calc.: Percent N, 4.70; percent Cl, 11.90.

EXAMPLE X

*8-Diethylaminomethyl-2,3-Dimethyl-7-Methoxy Chromone*-HCl

The same procedure was followed as in Example I, starting with 8-chloromethyl-2,3-dimethyl-7-methoxy chromone and diethylamine.

The yield was 68% and a product was obtained having a melting point of 202–203° C.

Analysis for $C_{17}H_{24}O_3NCl$.—Effective: Percent N, 4.27; percent Cl, 10.85. Calc.: Percent N, 4.30; percent Cl, 10.89.

EXAMPLE XI

*2,3-Dimethyl-7-Methoxy-8-Piperidinomethyl Chromone*-HCl

The same procedure was followed as in Example I, starting with 8-chloromethyl-2,3-dimethyl-7-methoxy chromone and piperidine.

The yield was 66% and a product was obtained having a melting point of 223–224° C.

Analysis for $C_{18}H_{24}O_3NCl$.—Effective: Percent N, 4.18; percent Cl, 10.47. Calc.: Percent N, 4.15; percent Cl, 10.49.

EXAMPLE XII

*2,3-Dimethyl-7-Methoxy-8-Morpholinomethyl Chromone*-HCl

The same procedure was followed as in Example I, starting with 8-chloromethyl-2,3-dimethyl-7-methoxy chromone and morpholine.

The yield was 64% and a product was obtained having a melting point of 224–225° C.

Analysis for $C_{17}H_{22}O_4NCl$.—Effective: Percent N, 4.10; percent Cl, 10.40. Calc.: Percent N, 4.12; percent Cl, 10.43.

EXAMPLE XIII

*3-Ethyl-2-Methyl-7-Methoxy-8-Piperidinomethyl Chromone*-HCl

The same procedure was followed as in Example I, starting with 8-chloromethyl-3-ethyl-2-methyl-7-methoxy chromone and piperidine.

The yield was 42% and a product was obtained having a melting point of 195–196° C.

Analysis for $C_{19}H_{26}O_3NCl$.—Effective: Percent N, 3.99; percent Cl, 10.1. Calc.: Percent N, 3.98; percent Cl, 10.08.

EXAMPLE XIV

*3-Ethyl-2-Methyl-7-Methoxy-8-Morpholinomethyl Chromone*-HCl

The same procedure was followed as in Example I, starting with 8-chloromethyl-3-ethyl-2-methyl-7-methoxy chromone and morpholine.

The yield was 53% and a product was obtained having a melting point of 208–209° C.

Analysis for $C_{18}H_{24}O_4NCl$.—Effective: Percent N, 3.94; percent Cl, 10.00. Calc.: Percent N, 3.96; percent Cl, 10.02.

EXAMPLE XV

*8-Diethylaminomethyl-2-Ethyl-3-Methyl-7-Methoxy Chromone*-HCl

The same procedure was followed as in Example I, starting with 8-chloromethyl-2-ethyl-3-methyl-7-methoxy chromone and diethylamine.

The yield was 44% and a product was obtained having a melting point of 185–186° C.

Analysis for $C_{18}O_{26}O_3NCl$.—Effective: Percent N, 4.13; percent Cl, 10.41. Calc.: Percent N, 4.12; percent Cl, 10.43.

EXAMPLE XVI

2-Ethyl-3-Methyl-7-Methoxy-8-Morpholinomethyl Chromone-HCl

The same procedure was followed as in Example I, starting with 8-chloromethyl-2-ethyl-3-methyl-7-methoxy chromone and morpholine.

The yield was 46% and a product was obtained having a melting point of 214–215° C.

Analysis for $C_{18}H_{24}O_4NCl$.—Effective: Percent N, 3.95; percent Cl, 10.1. Calc.: Percent N, 3.96; percent Cl, 10.02.

EXAMPLE XVII

2,3-Diethyl-7-Methoxy-8-Piperidinomethyl Chromone-HCl

The same procedure was followed as in Example I, starting with 8-chloromethyl-2,3-diethyl-7-methoxy chromone and piperidine.

The yield was 44% and a product was obtained having a melting point of 184–185° C.

Analysis for $C_{20}H_{28}O_3NCl$.—Effective: Percent N, 3.81; percent Cl, 9.70. Calc.: Percent N, 3.83; percent Cl, 9.69.

EXAMPLE XVIII

2,3-Diethyl-7-Methoxy-8-Morpholinomethyl Chromone-HCl

The same procedure was followed as in Example I, starting with 8-chloromethyl-2,3-diethyl-7-methoxy chromone and morpholine.

The yield was 42% and a product was obtained having a melting point of 177–178° C.

Analysis for $C_{19}H_{26}O_4NCl$.—Effective: Percent N, 3.75; percent Cl, 9.68. Calc.: Percent N, 3.81; percent Cl, 9.64.

In order to better illustrate the therapeutic value of the products of Formula 1, some data of the pharmacological tests are hereunder reported which show comparison to some of the better known medical products used as central stimulants, such as picrotoxin, metrazol and bemegride.

All these substances, when taken in high doses, cause tonic-clonic convulsions, evidence of the excitation of the central nervous system. Due to this reason, the $DC_{50}$ (dose in mg./kg. which causes convulsions in 50% of the treated animals) can be considered an optimum reference for calculating the exciting power of the various drugs in relation to the metrazol taken as a standard.

In the class examined, there are drugs even more active than the picrotoxin, which was heretofore considered as the most active one among the stimulating substances of the central nervous system.

The value of the $DL_{50}$, $DC_{50}$ and RP (Relative Power referred to the metrazol expressed as a ratio between the $DC_{50}$ thereof and the compound according to the present invention) are reported in the following table.

TABLE I

| Compound | $DL_{50}$ | $DC_{50}$ | RP |
| --- | --- | --- | --- |
| See Example X | 12.8 | 10.7 | 3.8 |
| See Example XI | 16.6 | 14.4 | 2.8 |
| See Example XII | 17.4 | 15.3 | 2.6 |
| See Example II | 27.5 | 21.8 | 1.9 |
| See Example III | 54.5 | 45.0 | 0.9 |
| See Example I | 4.8 | 4.03 | 10.1 |
| See Example IX | 3.28 | 2.98 | 13.6 |
| Metrazol | 71.0 | 40.5 | 1 |
| Picrotoxin | 7.2 | 3.4 | 11.9 |
| Bemegride | 25.0 | 11.1 | 2.9 |

The analeptic activity of these products was tested to determine whether the $DL_{50}$ of Nembutal, injected endoperitoneally into albino mice had an increased effect when treated with a single subcutaneous injection of the drugs under examination.

The values of this increase with reference to the compounds cited in Table I are reported in the following Table II.

TABLE II

| Compound: | Maximum $DL_{50}$ increase of Nembutal |
| --- | --- |
| See Example X | 1.62 |
| See Example XI | 1.50 |
| See Example XII | 1.91 |
| See Example II | 1.30 |
| See Example III | 1 |
| See Example I | 1.74 |
| See Example IX | 1.49 |
| Metrazol | 1.53 |
| Picrotoxin | 1.36 |
| Bemegride | 1.73 |

It appears from the foregoing table that among the compounds of this invention, there are some capable of resisting the lethal effects of Nembutal in a greater measure than the most active substances so far employed in this sense.

The breathing stimulating activity was tested on two compounds only of those illustrated above, namely on the compounds according to Examples XII and I, which are the most active compounds from the analeptic point of view.

The breathing stimulating activity was tested on non-narcotized rabbits and on rabbits whose respiration was depressed by means of 10 mg./kg. of morphine.

These activities are reported in the following Table III.

TABLE III

| Compound | Non-narcotized rabbits | | Morphinized rabbits | | Analeptic respiratory activity | |
| --- | --- | --- | --- | --- | --- | --- |
|  | T.I. | S.A. | T.I. | S.A. | T.I. | S.A. |
| See Example XII | 7.2 | 5.9 | 3.1 | 25 | 0.6 | 0.9 |
| See Example I | 8.7 | 257 | 6.3 | 187 | 1.8 | 9.4 |
| Metrazol | 1 | 1 | 1 | 1 | 0 | 0 |
| Bemegride | 4.4 | 12.5 | 5.0 | 14.2 | 1 | 1 |

In the above Table III the values are given of the therapeutic index (T.I.) and of the specific activity (S.A.), the latter in relation to metrazol and referred to the weight unit.

The last column gives the analeptic respiratory activity defined as the capacity of the drug in question to restore the morphine depressed breathing above the normal ventilation value.

The metrazol is not capable of restoring the depressed breathing up to the normal values and therefore bemegride was taken as a standard.

It appears clear from the foregoing that some of the compounds of this invention, and more particularly the compound according to Example I, are more active than some of the most widely known respiratory analeptics.

The compounds according to Examples X, XII, I and IX were tested in view of the chronic toxicity by giving them to albino mice growing up (10 males and 10 females) so that, for instance, said animals got pro die ca. $\frac{1}{10}$ of the $DL_{50}$. The treatment was continued for 50 days. The treated animals had, almost all, a weight increase greater than that of the control animals and an increase in red globules. No remarkable statistical differences between the weight averages of the various inner organs were found and no histologic lesions in said organs could be ascertained.

TABLE IV.—STRUCTURE AND PHARMACOLOGICAL ACTIVITY OF CNS STIMULANT ALKYLAMINOMETHYLCHROMONES

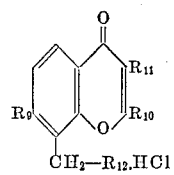

| From Example No. | $R_{10}$ | $R_{11}$ | $R_9$ | $R_{12}$ | Mol. weight | LD$_{50}$ Mg./kg. | LD$_{50}$ Moles/kg. | CNS stimulating activity (Pentylenetetrazol = 1) compared on— Weight basis | CNS stimulating activity (Pentylenetetrazol = 1) compared on— Molar basis | Effects upon arterial pressure | Respiratory stimulant action | Inotropism | Analeptic activity | Seizure type |
|---|---|---|---|---|---|---|---|---|---|---|---|---|---|---|
| I | $C_6H_5$ | $CH_3$ | $OCH_3$ | $N(CH_3)_2$ | 359.24 | 4.8 | 13 | 14.8 | 39.54 | Nil | ++ | Nil | ++ | c.t. |
| II | $C_6H_5$ | $CH_3$ | $OCH_3$ | $N(C_2H_5)_2$ | 387.90 | 28 | 72 | 2.5 | 7.14 | Nil | + | Nil | + | c. |
| III | $C_6H_5$ | $CH_3$ | $OCH_3$ | N⟨piperidine⟩ | 399.99 | 55 | 138 | 1.3 | 3.73 | Nil | + | Nil | 0 | c. |
| IV | $C_6H_5$ | $CH_3$ | $OCH_3$ | N⟨morpholine⟩ | 401.87 | 85 | 212 | 0.8 | 2.42 | Nil | + | Positive | + | c.t. |
| V | $C_6H_5$ | $C_2H_5$ | $OCH_3$ | $N(CH_3)_2$ | 373.87 | 20 | 54 | 3.5 | 9.52 | Nil | 0 | Nil | 0 | c. |
| VI | $C_6H_5$ | $C_2H_5$ | $OCH_3$ | $N(C_2H_5)_2$ | 401.92 | 60 | 149 | 1.2 | 3.45 | | | Nil | (b) | c. |
| VII | $C_6H_5$ | $C_2H_5$ | $OCH_3$ | N⟨piperidine⟩ | 413.93 | 550 | 1,329 | 0.1 | 0.39 | Nil | 0 | Nil | 0 | c.t. |
| VIII | $C_6H_5$ | $C_2H_5$ | $OCH_3$ | N⟨morpholine⟩ | 415.91 | 250 | 601 | 0.3 | 0.86 | | (a) | Nil | | c.t. |
| IX | $CH_3$ | $CH_3$ | $OCH_3$ | $N(CH_3)_2$ | 297.78 | 3.3 | 11 | 21.5 | 46.73 | Slightly hypertensive. | ++ | Positive | ++ | c.t. |
| X | $CH_3$ | $CH_3$ | $OCH_2$ | $N(C_2H_5)_2$ | 325.83 | 13 | 40 | 5.5 | 12.85 | do | ++ | Nil | ++ | c.t. |
| XI | $CH_3$ | $CH_3$ | $OCH_3$ | N⟨piperidine⟩ | 337.84 | 17 | 50 | 4.2 | 10.28 | do | ++ | Nil | ++ | c.t. |
| XII | $CH_3$ | $CH_3$ | $OCH_3$ | N⟨morpholine⟩ | 339.81 | 17.4 | 50 | 4.1 | 10.08 | Hypertensive. | ++ | Positive | ++ | c.t. |
| XIII | $CH_3$ | $C_2H_5$ | $OCH_3$ | N⟨piperidine⟩ | 351.87 | 50 | 142 | 1.4 | 3.62 | Slightly hypertensive. | + | Nil | + | c. |
| XIV | $CH_3$ | $C_2H_5$ | $OCH_3$ | N⟨morpholine⟩ | 353.84 | 65 | 184 | 1.3 | 2.79 | Nil | + | Nil | ++ | c. |
| XV | $C_2H_5$ | $CH_3$ | $OCH_3$ | $N(C_2H_5)_2$ | 339.86 | 20 | 59 | 3.5 | 8.71 | Hypertensive. | + | Nil | ++ | c.t. |
| XVI | $C_2H_5$ | $CH_3$ | $OCH_3$ | N⟨morpholine⟩ | 353.84 | 17 | 48 | 5.9 | 10.71 | Nil | + | Nil | ++ | c.t. |
| XVII | $C_2H_5$ | $C_2H_5$ | $OCH_3$ | N⟨piperidine⟩ | 365.89 | 40 | 109 | 1.8 | 4.72 | Nil | ++ | Nil | + | c.t. |
| XVIII | $C_2H_5$ | $C_2H_5$ | $OCH_3$ | N⟨morpholine⟩ | 367.87 | 65 | 177 | 1.3 | 2.90 | Slightly hypertensive. | + | Positive | ++ | c. | a The water-solubility was too low for intravenous administration.
b The water-solubility was lower than 1% and therefore no proof of analeptic activity was performed.

What is claimed is:

1. A compound of the formula:

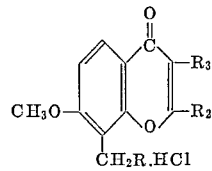

wherein R is a member selected from the group consisting of

in which $R_4$ and $R_5$ are alkyl having less than 3 carbon atoms,

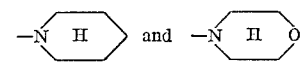

$R_2$ is a member selected from the group consisting of alkyl having less than 3 carbon atoms and phenyl and $R_3$ is alkyl having less than 3 carbon atoms.

2. 8-dimethylaminomethyl - 7 - methoxy - 3 - methyl-2-phenyl chromone-HCl.

3. 2,3-dimethyl - 8 - dimethyl-aminomethyl-7-methoxy-chromone-HCl.

4. 2,3 - dimethyl - 7 - methoxy-8-morpholinomethyl chromone-HCl.

References Cited in the file of this patent

UNITED STATES PATENTS 3,046,275    Kohlstaedt et al. _____ July 24, 1962

FOREIGN PATENTS 728,767    Great Britain _____ Apr. 27, 1955

OTHER REFERENCES

Da Re et al.: Nature, vol. 184, pages 362 and 363; August 1, 1959, Q 1 N 1.